US010904430B2

(12) United States Patent
Liu (10) Patent No.: US 10,904,430 B2
(45) Date of Patent: Jan. 26, 2021

(54) METHOD FOR PROCESSING IMAGE, IMAGE PROCESSING APPARATUS, MULTI-CAMERA PHOTOGRAPHING APPARATUS, AND AERIAL VEHICLE

(71) Applicant: AUTEL ROBOTICS CO., LTD., Guangdong (CN)

(72) Inventor: Yang Liu, Guangdong (CN)

(73) Assignee: Autel Robotics Co., Ltd., Guangdon (CN)

( * ) Notice: Subject to any disclaimer, the term of this patent is extended or adjusted under 35 U.S.C. 154(b) by 0 days.

(21) Appl. No.: 16/388,292

(22) Filed: Apr. 18, 2019

(65) Prior Publication Data

US 2019/0253620 A1 Aug. 15, 2019

Related U.S. Application Data

(63) Continuation of application No. PCT/CN2017/106143, filed on Oct. 13, 2017.

(30) Foreign Application Priority Data

Oct. 20, 2016 (CN) .......................... 2016 1 0914681

(51) Int. Cl.
*H04N 5/00* (2011.01)
*H04N 5/232* (2006.01)
(Continued)

(52) U.S. Cl.
CPC ....... *H04N 5/23229* (2013.01); *B64C 39/024* (2013.01); *B64D 47/08* (2013.01);
(Continued)

(58) Field of Classification Search
CPC .. H04N 7/185; H04N 5/2328; H04N 5/23296; H04N 5/23293; H04N 5/23232;
(Continued)

(56) References Cited

U.S. PATENT DOCUMENTS 9,538,096 B2   1/2017 Dolgin
9,952,485 B1*  4/2018 Luski .................. G03B 17/561
(Continued)

FOREIGN PATENT DOCUMENTS

CN   1587910 A    3/2005
CN   105409212 A  3/2016
(Continued)

OTHER PUBLICATIONS

"Camera_lens_Wiki". see https://en.wikipedia.org/wiki/Camera_lens.*
(Continued)

*Primary Examiner* — Zhihan Zhou (57) ABSTRACT

The present application discloses a method for processing an image, an image processing apparatus, a multi-camera photographing apparatus and an aerial vehicle. A first image photographed by a first lens module is obtained, the first image including a target object; then a second image photographed by a second lens module is obtained; and image processing is performed on the first image and the second image, and an output image is generated, so that a range in a large-perspective scene and precision of the target object in a small-perspective scene can be both combined.

19 Claims, 6 Drawing Sheets

(51) Int. Cl.
    *H04N 7/18*     (2006.01)
    *B64D 47/08*     (2006.01)
    *B64C 39/02*     (2006.01)
    *H04N 5/272*     (2006.01)
    *H04N 5/225*     (2006.01)

(52) U.S. Cl.
    CPC ....... *H04N 5/2258* (2013.01); *H04N 5/23232* (2013.01); *H04N 5/23296* (2013.01); *H04N 5/272* (2013.01); *H04N 7/185* (2013.01); *B64C 2201/127* (2013.01)

(58) Field of Classification Search
    CPC .. H04N 5/2624; H04N 5/272; H04N 5/23229; H04N 5/2258; B64C 2201/127; B64C 39/024; B64D 47/08
    See application file for complete search history.

(56) References Cited

U.S. PATENT DOCUMENTS 10,074,183 B1 * 9/2018 Watson .................. G06T 7/593
2002/0180759 A1 * 12/2002 Park ...................... G06T 3/0012
    345/629
2014/0240469 A1 * 8/2014 Lee ........................ G01C 11/00
    348/48
2015/0215516 A1 * 7/2015 Dolgin ............... H04N 5/23293
    348/169
2018/0048825 A1 * 2/2018 Wang .................. H04N 5/2258

FOREIGN PATENT DOCUMENTS

| | | |
|---|---|---|
| CN | 105890590 A | 8/2016 |
| CN | 105893510 A | 8/2016 |
| CN | 106506941 A | 3/2017 |
| EP | 2962460 A1 | 1/2016 |
| HK | 1222752 A1 | 7/2017 |
| WO | 2014/133689 A1 | 9/2014 |

OTHER PUBLICATIONS

International Search Report dated Dec. 29, 2017; PCT/CN2017/106143.

* cited by examiner

METHOD FOR PROCESSING IMAGE, IMAGE PROCESSING APPARATUS, MULTI-CAMERA PHOTOGRAPHING APPARATUS, AND AERIAL VEHICLE

CROSS-REFERENCE

The present application is a continuation of International Application NO. PCT/CN2017/106143, filed on Oct. 13, 2017, which claims priority of Chinese Patent Application NO. 2016109146811, filed on Oct. 20, 2016, both of which are hereby incorporated herein by reference in their entireties.

TECHNICAL FIELD

Implementations of the present application relate to the field of image processing technologies, and in particular, to a method for processing an image, an image processing apparatus, a multi-camera photographing apparatus, and an aerial vehicle.

RELATED ART

Aerial vehicles in the prior art are generally equipped with normal lenses for aerial photography. The focus of the normal lens is usually defined in infinitely remote locations, and the resolution of an image sensor is very limited. Consequently, some small targets in a ground scene cannot be clearly photographed. In addition, lenses used for aerial photography generally have a relatively narrow perspective, and therefore a photographed scene range is relatively limited. In the prior art, some aerial vehicles are equipped with zoom lenses for aerial photography, and a perspective is adjusted between 100 to 900. To clearly photograph a small target in the ground scene, the lens needs to be zoomed to a long focal length. To photograph a relatively wide scene, the lens needs to be switched to a wide angle. The zoom lens has a relatively large weight, increasing the load of the aerial vehicle and reducing the flight performance of the aerial vehicle. Besides, an image sensor of the zoom lens is relatively undiversified and cannot change.

In the prior art, adjusting the size of the scene perspective through zooming of the lens cannot combine requirements of both a large-perspective scene and a small-perspective scene.

SUMMARY

A main technical problem to be resolved in implementations of the present application is to provide a method for processing an image, an image processing apparatus, a multi-camera photographing apparatus, and an aerial vehicle, to combine requirements of both a large-perspective scene and a small-perspective scene.

According to a first aspect, an embodiment of the present application provides a method for processing an image, where the image is photographed by a multi-camera photographing apparatus, the multi-camera photographing apparatus including a first lens module and a second lens module, and the method includes:
  obtaining a first image photographed by the first lens module, the first image including a target object;
  obtaining a second image photographed by the second lens module, the second image including the target object, and a quantity of pixels of the target object included in the second image being greater than a quantity of pixels of the target object in the first image; and
  performing image processing on the first image and the second image, and generating an output image.

In an embodiment of the present application, the method further includes:
  obtaining location information of the target object; and
  adjusting an optical axis of the second lens module based on the location information of the target object, so that the optical axis of the second lens module faces the target object.

In an embodiment of the present application, the performing image processing on the first image and the second image, and generating the output image includes:
  replacing an area in the first image that includes the target object with the second image, and determining the first image obtained after the replacement as the output image.

In an embodiment of the present application, the performing image processing on the first image and the second image, and generating the output image includes:
  overlaying the second image on the first image, and determining the first image and the second image that are overlaid as the output image.

In an embodiment of the present application, the method further includes:
  performing optical axis correction on optical axes of the first lens module and the second lens module.

In an embodiment of the present application, the method further includes:
  performing registration analysis on the first lens module and the second lens module, and generating a corresponding registration parameter.

In an embodiment of the present application, the performing image processing on the first image and the second image, and generating the output image includes:
  performing image processing on the first image and the second image based on the registration parameter, and outputting the image.

In an embodiment of the present application, a focal length of the first lens module and a focal length of the second lens module are both fixed focal lengths.

In an embodiment of the present application, the first lens module includes a normal lens module and/or a wide-angle lens module and the second lens module includes a long-focus lens module.

In an embodiment of the present application, the first lens module includes the normal lens module and the wide-angle lens module, the normal lens module having an equivalent focal length of 35 mm, the wide-angle lens module having an equivalent focal length of 18 mm to 24 mm, and an equivalent focal length of the long-focus lens module being 3 to 20 times the equivalent focal length of the wide-angle lens module.

According to a second aspect, an embodiment of the present application provides a multi-camera photographing apparatus, where the multi-camera photographing apparatus includes a body, and a first lens module and a second lens module that are disposed on the body, the first lens module and the second lens module being arranged in an array on the body.

In an embodiment of the present application, the first lens module includes at least two lens modules.

In an embodiment of the present application, the first lens module and the second lens module are arranged in an isosceles triangle.

In an embodiment of the present application, the first lens module and the second lens module are linearly arranged.

In an embodiment of the present application, a focal length of the first lens module and a focal length of the second lens module are both fixed focal lengths.

In an embodiment of the present application, the first lens module includes a normal lens module and/or a wide-angle lens module and the second lens module includes a long-focus lens module.

In an embodiment of the present application, the first lens module includes the normal lens module and the wide-angle lens module, the normal lens module having an equivalent focal length of 35 mm, the wide-angle lens module having an equivalent focal length of 18 mm to 24 mm, and an equivalent focal length of the long-focus lens module being 3 to 20 times the equivalent focal length of the wide-angle lens module.

According to a third aspect, an embodiment of the present application provides an image processing apparatus, where the image is photographed by a multi-camera photographing apparatus, the multi-camera photographing apparatus including a first lens module and a second lens module, and the apparatus includes:
- a first obtaining module, configured to obtain a first image photographed by the first lens module, the first image including a target object;
- a second obtaining module, configured to obtain a second image photographed by the 25 second lens module, the second image including the target object, and a quantity of pixels of the target object included in the second image being greater than a quantity of pixels of the target object in the first image; and
- an image generation module, configured to perform image processing on the first image and the second image and to generate an output image.

In an embodiment of the present application, the apparatus further includes a location obtaining module and an adjustment module, the location obtaining module being configured to obtain location information of the target object, and the adjustment module being configured to adjust an optical axis of the second lens module based on the location information of the target object, so that the optical axis of the second lens module faces the target object.

In an embodiment of the present application, the image generation module is configured to replace an area in the first image that includes the target object with the second image and to output the first image obtained after the replacement as the output image.

In an embodiment of the present application, the image generation module is configured to overlay the second image on the first image and to output the first image and the second image that are overlaid as the output image.

In an embodiment of the present application, the apparatus further includes:
- a correction module, configured to perform optical axis correction on optical axes of the first lens module and the second lens module.

In an embodiment of the present application, the apparatus further includes:
- an analysis module, configured to perform registration analysis on the first lens module and the second lens module and to generate a corresponding registration parameter.

In an embodiment of the present application, the image generation module is further configured to perform image processing on the first image and the second image based on the registration parameter and to generate the output image.

In an embodiment of the present application, a focal length of the first lens module and a focal length of the second lens module are both fixed focal lengths.

In an embodiment of the present application, the first lens module includes a normal lens module and/or a wide-angle lens module and the second lens module includes a long-focus lens module.

In an embodiment of the present application, the first lens module includes the normal lens module and the wide-angle lens module, the normal lens module having an equivalent focal length of 35 mm, the wide-angle lens module having an equivalent focal length of 18 mm to 24 mm, and an equivalent focal length of the long-focus lens module being 3 to 20 times the equivalent focal length of the wide-angle lens module.

According to a fourth aspect, an embodiment of the present application provides an aerial vehicle, including a vehicle body, arms connected to the vehicle body, power apparatuses disposed on the arms, a multi-camera photographing apparatus connected to the vehicle body and an image processing chip, the multi-camera photographing apparatus including a first lens module and a second lens module, and the image processing chip being configured to:
- obtain a first image photographed by the first lens module, the first image including a target object;
- obtain a second image photographed by the second lens module, the second image including the target object, and a quantity of pixels of the target object included in the second image being greater than a quantity of pixels of the target object in the first image; and
- perform image processing on the first image and the second image, and generate an output image.

In an embodiment of the present application, the image processing chip is specifically configured to:
- replace an area in the first image that includes the target object with the second image, and determine the first image obtained after the replacement as the output image.

In an embodiment of the present application, the image processing chip is specifically configured to:
- overlay the second image on the first image, and determine the first image and the second image that are overlaid as the output image.

In an embodiment of the present application, the aerial vehicle further includes a controller and a gimbal that are connected to the vehicle body, the controller being configured to control the gimbal to perform optical axis correction on optical axes of the first lens module and the second lens module.

In an embodiment of the present application, the controller is further configured to obtain location information of the target object and to adjust an optical axis of the second lens module based on the location information of the target object, so that the optical axis of the second lens module faces the target object.

In an embodiment of the present application, the controller is further configured to perform registration analysis on the first lens module and the second lens module and to generate a corresponding registration parameter.

In an embodiment of the present application, the aerial vehicle further includes a controller, configured to perform registration analysis on the first lens module and the second lens module and to generate a corresponding registration parameter.

In an embodiment of the present application, the image processing chip is further configured to perform image processing on the first image and the second image based on the registration parameter and to generate the output image.

In an embodiment of the present application, the multi-camera photographing apparatus includes a body, and a first lens module and a second lens module that are disposed on the body, the first lens module and the second lens module being arranged in an array on the body.

In an embodiment of the present application, the first lens module includes at least two lens modules.

In an embodiment of the present application, the first lens module and the second lens module are arranged in an isosceles triangle.

In an embodiment of the present application, the first lens module and the second lens module are linearly arranged.

In an embodiment of the present application, a focal length of the first lens module and a focal length of the second lens module are both fixed focal lengths.

In an embodiment of the present application, the first lens module includes a normal lens module and/or a wide-angle lens module and the second lens module includes a long-focus lens module.

In an embodiment of the present application, the first lens module includes the normal lens module and the wide-angle lens module, the normal lens module having an equivalent focal length of 35 mm, the wide-angle lens module having an equivalent focal length of 18 mm to 24 mm, and an equivalent focal length of the long-focus lens module being 3 to 20 times the equivalent focal length of the wide-angle lens module.

According to a fifth aspect, an embodiment of the present application provides an aerial vehicle, including: a body, a gimbal disposed on the body and a multi-camera photographing apparatus disposed on the gimbal, the multi-camera photographing apparatus including a first lens module and a second lens module, and the aerial vehicle further including:

at least one processor; and
  a memory in communication connection with the at least one processor, where
    the memory stores an instruction capable of being executed by the at least one processor, and the instruction is executed by the at least one processor, to enable the at least one processor to perform the foregoing method for processing an image.

The embodiments of the present application provide a method for processing an image, an image processing apparatus, a multi-camera photographing apparatus and an aerial vehicle. A first image photographed by a first lens module is obtained, the first image including a target object; then a second image photographed by a second lens module is obtained; and image processing is performed on the first image and the second image, and an output image is generated, so that a range in a large-perspective scene and precision of the target object in a small-perspective scene can be both combined.

BRIEF DESCRIPTION OF THE DRAWINGS

To more clearly describe technical solutions of embodiments of the present application, accompanying drawings required in the embodiments of the present application are briefly described below. Obviously, the accompanying drawings described below are merely some embodiments of the present application. Persons of ordinary skill in the art may derive other accompanying drawings based on these accompanying drawings without creative efforts.

DETAILED DESCRIPTION

To make the objectives, technical solutions, and advantages of the present application clearer and more comprehensible, the following further describes the present application in detail with reference to the accompanying drawings and embodiments. It should be understood that the specific embodiments described herein are merely intended to explain the present application rather than limit the present application.

In addition, technical features in implementations of the present application described below may be combined with each other, provided that no conflict exists therebetween.

The embodiments of the present application are specifically described below with reference to specific accompanying drawings.

Figure 1:
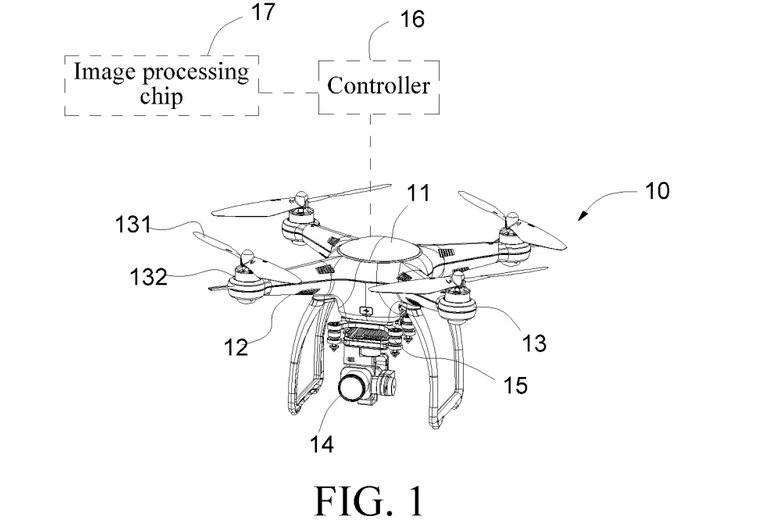
FIG. 1 is a schematic structural diagram of an aerial vehicle according to an embodiment of the present application.

As shown in FIG. 1, an aerial vehicle 10 includes a housing 11, arms 12 connected to the housing 11, a power apparatus 13 disposed at one end of each arm 12, a gimbal 15 connected to the housing 11, a multi-camera photographing apparatus 14 connected to the gimbal 15, and a controller 16 and an image processing chip 17 that are disposed in the housing 11.

In this embodiment, there are four arms 12, that is, the aerial vehicle is a four-rotor aerial vehicle. In other possible embodiments, there may be three arms 12, six arms 12, eight arms 12, ten arms 12, or the like. The aerial vehicle 10 may alternatively be other movable objects such as a manned aerial vehicle, a model airplane, an unmanned airship, a fixed-wing unmanned aerial vehicle, or an unmanned hot air balloon.

The power apparatus 13 includes a motor 132 disposed at one end of the arm 12 and a propeller 131 connected to a rotating shaft of the motor 132. The rotating shaft of the motor 132 rotates to drive the propeller 131 to rotate, so as to provide a lift force for the aerial vehicle 10.

The gimbal 15 is configured to reduce and even eliminate vibration transferred from the power apparatus 13 to the multi-camera photographing apparatus 14, to ensure that the multi-camera photographing apparatus 14 can photograph a stable and clear image or video. The multi-camera photographing apparatus 14 is carried on the aerial vehicle 10 by using the gimbal 15 described in this embodiment.

Figure 2:
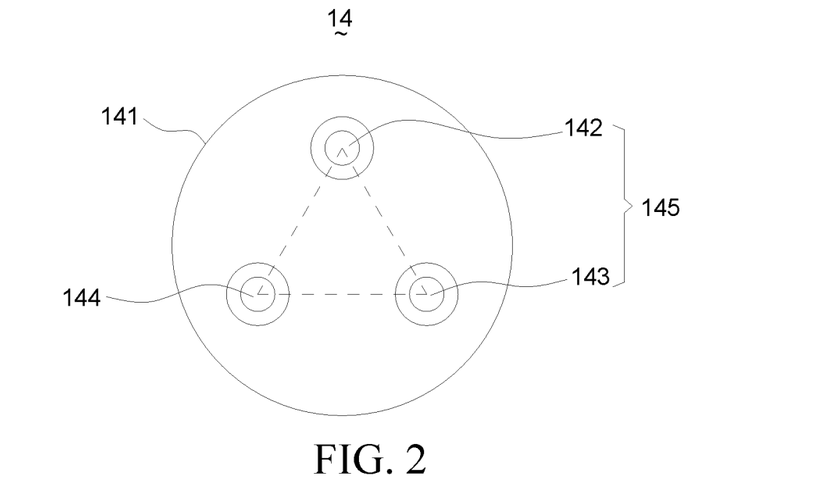
FIG. 2 is a schematic structural diagram of an embodiment of a multi-camera photographing apparatus in the aerial vehicle shown in FIG. 1.

As shown in FIG. 2, the multi-camera photographing apparatus 14 includes a body 141, and a first lens module 145 and a second lens module 144 that are disposed on the body 141. The first lens module 145 and the second lens module 144 are both fixed-focus lens modules. Because the first lens module 145 and the second lens module 144 are both fixed-focus lenses, a lighter material can be used during design and a mechanical apparatus of a zoom lens is eliminated.

In an embodiment of the present application, the first lens module 145 includes two lens modules, and the two lens modules are respectively a normal lens module 142 and a wide-angle lens module 143. The second lens module 144 is a long-focus lens module. In an embodiment of the present application, the normal lens module 142 has an equivalent focal length of 35 mm, the wide-angle lens module 143 has an equivalent focal length of 18 mm to 24 mm, and an equivalent focal length of the long-focus lens module 144 is 3 to 20 times the equivalent focal length of the wide-angle lens module 143. In this embodiment of the present application, image sensors having corresponding resolutions may be flexibly configured for the wide-angle lens module 143 and the long-focus lens module 144.

Figure 3:
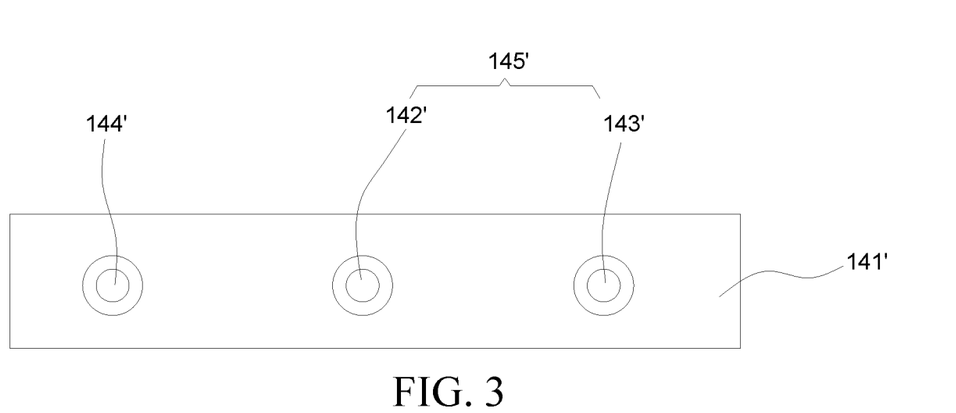
FIG. 3 is a schematic structural diagram of another embodiment of a multi-camera photographing apparatus in the aerial vehicle shown in FIG. 1.

In an embodiment of the present application, on the premise that the first lens module 145 includes at least two lens modules, the first lens module 145 and the second lens module 144 are arranged in an array. Specifically, as shown in FIG. 2, the normal lens module 142, the wide-angle lens module 143 and the long-focus lens module 144 are arranged in an isosceles triangle. In other possible embodiments, the first lens module 145' and the second lens module 144' may alternatively be linearly arranged. Specifically, as shown in FIG. 3, the normal lens module 142', the wide-angle lens module 143' and the long-focus lens module 144' are linearly arranged at equal intervals. The long-focus lens module 144' and the wide-angle lens module 143' are arranged on two sides of the normal lens module 142'.

Before the multi-camera photographing apparatus 14 is started, the controller 16 first controls the gimbal 15 to correct optical axes of the first lens module 145 and the second lens module 144 and to record optical axis correction parameters of the first lens module 145 and the second lens module 144. It may be understood that the optical axis correction of the first lens module 145 and the second lens module 144 may alternatively be completed at delivery by using an existing lens-module optical axis correction technology.

Considering differences between cameras, when the multi-camera photographing apparatus 14 is started, the controller 16 needs to perform registration analysis on the first lens module 145 and the second lens module 144 and generate a corresponding registration parameter.

An example in which the first lens module 145 includes the normal lens module 142 and the wide-angle lens module 143 is used. When a target object of interest appears in a scene, the wide-angle lens module 143 photographs image data, and the controller 16 obtains location information of the target object based on the image data obtained by the wide-angle lens module 143, and adjusts the optical axis of the second lens module 144, so that the optical axis of the second lens module 144 faces the target object of interest.

In this case, the image processing chip 17 obtains a first image photographed by the first lens module 145, the first image including the target object. In this embodiment of the present application, the target object may include, but is not limited to, objects such as a person, an animal, a plant, an automobile and a building. The first image may be a single frame of image that is captured by the first lens module. The aerial vehicle may further include an image recognition chip, configured to obtain a feature parameter of the target object, where the feature parameter is used for tracing the target object and may be used for representing an overall contour of the target object. For example, the multi-camera photographing apparatus is mounted on the aerial vehicle. The aerial vehicle can target an automobile by obtaining a feature parameter such as a license number and/or an automobile body contour and/or an automobile color of the automobile, and further trace the automobile.

Next, the image processing chip 17 obtains a second image photographed by the second lens module 144, the second image also including the target object, and a quantity of pixels of the target object included in the second image being greater than a quantity of pixels of the target object in the first image. In an embodiment of the present application, the second lens module 144 is a long-focus lens module.

At last, the image processing chip 17 performs image processing on the first image and the second image based on the registration parameter obtained by the controller 16 and generates an output image.

Figure 4:
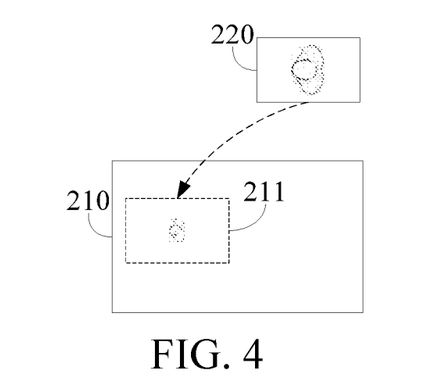
FIG. 4 is a schematic diagram of a first image and a second image.
Figure 5:
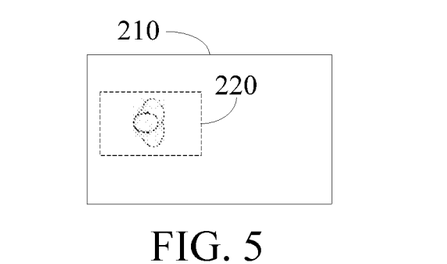
FIG. 5 is a schematic diagram of an output image obtained through image compositing according to an embodiment of the present application.

In an optional implementation, processing manners for the first image and the second image may be image compositing. Specifically, as shown in FIG. 4, the image processing chip 17 replaces an area 211 in the first image 210 that includes the target object with the second image 220, and as shown in FIG. 5, determines the first image 210 including the second image 220 as the output image. That is, an image in a corresponding area in a large perspective image is replaced with a clear small-perspective image that is photographed, so that the clear image of the target object can be seen in the large-perspective image.

Figure 6:
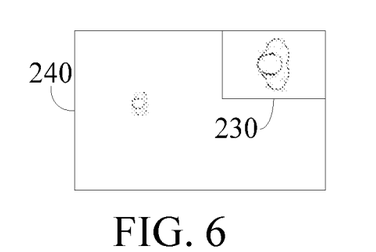
FIG. 6 is a schematic diagram of an output image obtained through image overlaying according to an embodiment of the present application.

In an optional implementation, combination manners for the first image and the second image may alternatively be image overlaying. Specifically, as shown in FIG. 6, the image processing chip 17 overlays the second image 230 on the first image 240, and determines the first image 240 and the second image 230 that are overlaid as the output image. The second image 230 may be overlaid at positions such as a top right corner, a top left corner, a bottom right corner, or a bottom left corner of the first image 240, and the second image 230 may be zoomed in or zoomed out according to a user operation. For example, the second image 230 is zoomed in through a double-touch operation, to cover the first image 240.

According to the aerial vehicle in the present application, when a target of interest appears in a scene, a range in a large-perspective scene and precision in a small-perspective scene can be both combined, to obtain an output image having relatively high precision.

Figure 7:
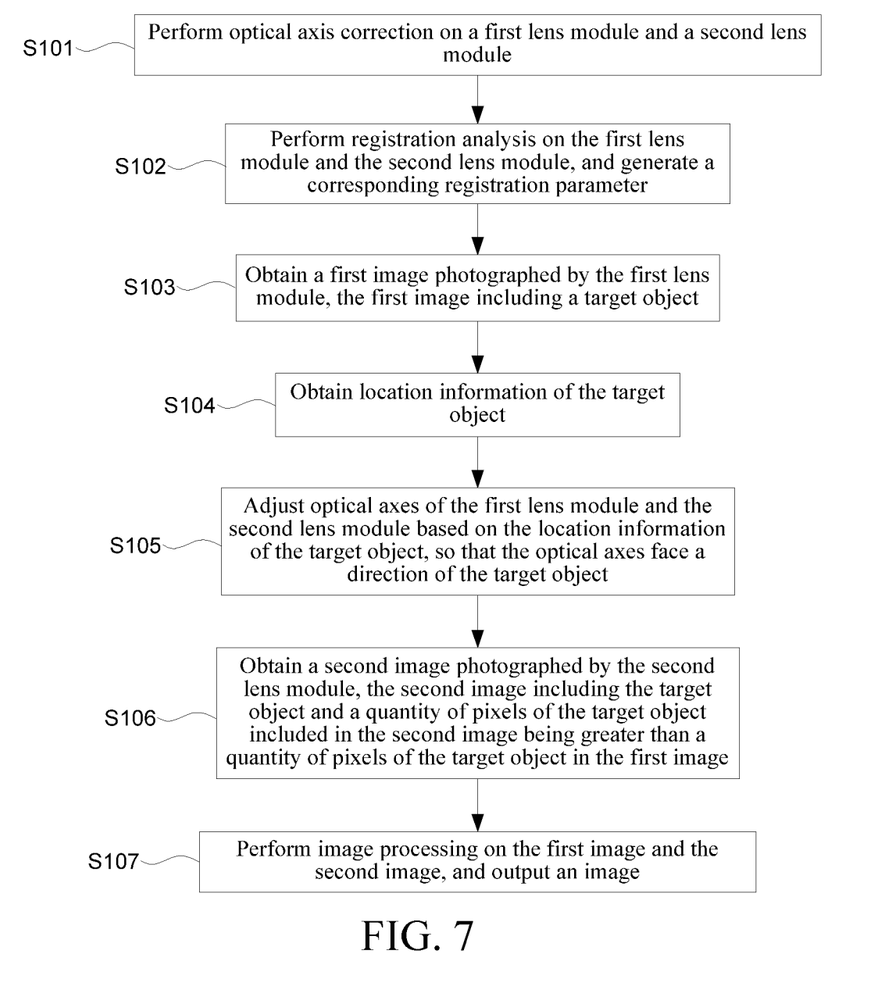
FIG. 7 is a flowchart of a method for processing an image according to an embodiment of the present application.

As shown in FIG. 7, an embodiment of the present application provides a method for processing an image, where the image is photographed by a multi-camera photographing apparatus, the multi-camera photographing apparatus including a first lens module and a second lens module, and the method may include the following steps.

S101: Perform optical axis correction on the first lens module and the second lens module.

The optical axis correction of the first lens module and the second lens module may be completed by using an optical axis correction algorithm of a controller located in an aerial vehicle, or may be completed at delivery by using an existing lens-module optical axis correction technology.

S102: Perform registration analysis on the first lens module and the second lens module, and generate a corresponding registration parameter.

Considering differences between cameras, when the multi-camera photographing apparatus 14 is started, the controller 16 needs to perform registration analysis on the first lens module 145 and the second lens module 144 and generate the corresponding registration parameter. The registration parameter may be used as a basis of subsequent image processing.

Obtaining location information of a target object belongs to the prior art, and details are not described herein again.

S103: Obtain a first image photographed by the first lens module, the first image including a target object.

In this embodiment of the present application, the target object may include, but is not limited to, objects such as a person, an animal, a plant, an automobile and a building. The first image may be a single frame of image that is captured by the first lens module. In an embodiment of the present application, before step S103, the method may further include: obtaining a feature parameter of the target object, where the feature parameter is used for tracing the target object and may be used for representing an overall contour of the target object. For example, the multi-camera photographing apparatus is mounted on the aerial vehicle. The aerial vehicle can target an automobile by obtaining a feature parameter such as a license number and/or an automobile body contour and/or an automobile color of the automobile, and further trace the automobile. For another example, a person can be traced by obtaining a feature parameter such as a facial contour and/or a body contour and/or a clothes color of the person. The feature parameter of the target object may be obtained by photographing the target object by the first lens module, or may be obtained from a device such as a server or another intelligent terminal through wireless transmission. This is not limited in this embodiment of the present application.

S104: Obtain location information of the target object.

The location information of the target object may be obtained by using a currently known technology, and details are not described herein again.

S105: Adjust an optical axis of the second lens module based on the location information of the target object, so that the optical axis faces a direction of the target object.

S106: Obtain a second image photographed by the second lens module, the second image including the target object, and a quantity of pixels of the target object included in the second image being greater than a quantity of pixels of the target object in the first image.

The target object included in the second image and the target object included in the first image are a same target object, and there are more pixels of the target object in the second image. Therefore, the target object in the second image is clearer.

S107: Perform image processing on the first image and the second image, and generate an output image.

In an optional implementation, combination manners for the first image and the second image may be image compositing. Specifically, as shown in FIG. 4, an area 211 in the first image 210 that includes the target object is replaced with the second image 220, and as shown in FIG. 5, the first image 210 including the second image 220 is determined as the output image. That is, an image in a corresponding area in a large perspective is replaced with a clear small-perspective image that is photographed, so that the clear image of the target object can be seen in the large-perspective image.

In an optional implementation, combination manners for the first image and the second image may alternatively be image overlaying. Specifically, as shown in FIG. 6, the second image 230 is overlaid on the first image 240, and the first image 240 and the second image 230 that are overlaid are determined as the output image. The second image 230 may be overlaid at positions such as a top right corner, a top left corner, a bottom right corner, or a bottom left corner of the first image 240, and the second image 230 may be zoomed in or zoomed out according to a user operation. For example, the second image 230 is zoomed in through a double-touch operation, so that the second image 230 is displayed in full screen, and the first image 240 is zoomed out and may be caused to be located at a position at which the second image 230 is originally located.

Figure 8:
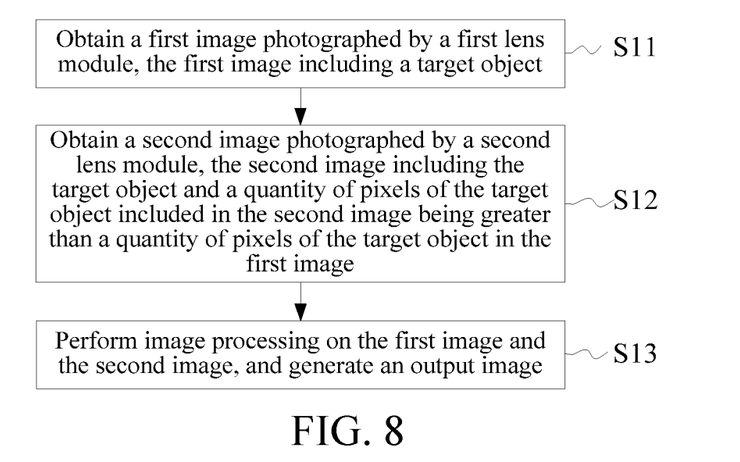
FIG. 8 is a flowchart of a method for processing an image according to another embodiment of the present application.

As shown in FIG. 8, an embodiment of the present application provides a method for processing an image, where the image is photographed by a multi-camera photographing apparatus, the multi-camera photographing apparatus including a first lens module and a second lens module, and the method may include the following steps.

Step S11: Obtain a first image photographed by the first lens module, the first image including a target object.

In this embodiment of the present application, the target object may include, but is not limited to, objects such as a person, an animal, a plant, an automobile and a building. The first image may be a single frame of image that is captured by the first lens module. In an embodiment of the present application, before step S11, the method may further include: obtaining a feature parameter of the target object, where the feature parameter is used for tracing the target object and may be used for representing an overall contour of the target object. For example, the multi-camera photographing apparatus is mounted on an aerial vehicle. The aerial vehicle can target an automobile by obtaining a feature parameter such as a license number and/or an automobile body contour and/or an automobile color of the automobile, and further trace the automobile. For another example, a person can be traced by obtaining a feature parameter such as a facial contour and/or a body contour and/or a clothes color of the person. The feature parameter of the target object may be obtained by photographing the target object by the first lens module, or may be obtained from a device such as a server or another intelligent terminal through wireless transmission. This is not limited in this embodiment of the present application.

Step S12: Obtain a second image photographed by the second lens module, the second image including the target object, and a quantity of pixels of the target object included in the second image being greater than a quantity of pixels of the target object in the first image.

In this embodiment of the present application, after an optical axis of the second lens module faces the target object, the second lens module photographs the second image, the second image including the target object.

In an optional implementation, a focal length of the first lens module and a focal length of the second lens module are both fixed focal lengths. An image sensor configured for a zoom lens is undiversified and cannot change, while image sensors having corresponding resolutions may be flexibly configured for the fixed-focus first lens module and second lens module. In addition, a zoom lens is generally heavier than a fixed-focus lens, and the first lens module and the second lens module are both fixed-focus lenses. A lighter material can be used during design and a mechanical apparatus of a zoom lens is eliminated, so that the load of the aerial vehicle can be reduced.

In this embodiment of the present application, the focal length of the first lens module is different from the focal length of the second lens module. Preferably, the focal length of the first lens module is less than the focal length of the second lens module. The first lens module may include a normal lens module and/or a wide-angle lens module and the second lens module may include a long-focus lens module. The first image photographed by the first lens module belongs to a large-perspective scene and the second image photographed by the second lens module belongs to a small-perspective scene.

When the first lens module includes the normal lens module and the wide-angle lens module, the normal lens module, the wide-angle lens module and the long-focus lens module may be arranged in a triangle or may be linearly arranged. Optionally, the normal lens module may have an equivalent focal length of 35 mm, the wide-angle lens module may have an equivalent focal length of 18 mm to 24 mm, and an equivalent focal length of the long-focus lens module may be 3 to 20 times the equivalent focal length of the wide-angle lens module.

Step S13: Perform image processing on the first image and the second image, and generate an output image.

In an optional implementation, combination manners for the first image and the second image may be image compositing. Specifically, as shown in FIG. 4, an area 211 in the first image 210 that includes the target object is replaced with the second image 220, and as shown in FIG. 5, the first image 210 including the second image 220 is determined as the output image. That is, an image in a corresponding area in a large perspective is replaced with a clear small-perspective image that is photographed, so that the clear image of the target object can be seen in the large-perspective image.

In an optional implementation, combination manners for the first image and the second image may alternatively be image overlaying. Specifically, as shown in FIG. 6, the second image 230 is overlaid on the first image 240, and the first image 240 and the second image 230 that are overlaid are determined as the output image. The second image 230 may be overlaid at positions such as a top right corner, a top left corner, a bottom right corner, or a bottom left corner of the first image 240, and the second image 230 may be zoomed in or zoomed out according to a user operation. For example, the second image 230 is zoomed in through a double-touch operation, so that the second image 230 is displayed in full screen, and the first image 240 is zoomed out and may be caused to be located at a position at which the second image 230 is originally located.

Figure 9:
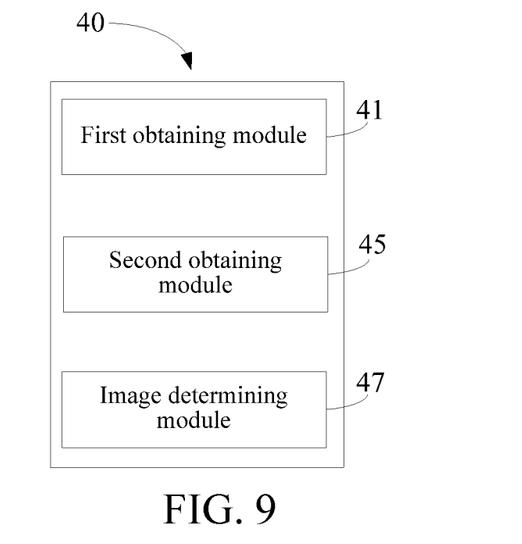
FIG. 9 is a functional block diagram of an image processing apparatus according to an embodiment of the present application.

As shown in FIG. 9, an embodiment of the present application provides an image processing apparatus 40, which may be configured to perform a method for processing an image disclosed in the embodiments of the present application. The image is photographed by a multi-camera photographing apparatus, the multi-camera photographing apparatus including s first lens module and a second lens module. The multi-camera photographing apparatus may be mounted in the image processing apparatus 40, or may be mounted in another device and transmit, to the image processing apparatus 40, an image photographed by the device. The apparatus 40 may include a first obtaining module 41, a second obtaining module 45, and an image generation module 47.

The first obtaining module 41 is configured to obtain a first image photographed by the first lens module, the first image including a target object.

In this embodiment of the present application, the target object may include, but is not limited to, objects such as a person, an animal, a plant, an automobile and a building. The first image may be a single frame of image that is captured by the first lens module. The apparatus may further include a feature parameter obtaining module, configured to obtain a feature parameter of the target object before the first obtaining module 41 obtains the first image photographed by the first lens module, where the feature parameter is used for tracing the target object and may be used for representing an overall contour of the target object. For example, the multi-camera photographing apparatus is mounted on an aerial vehicle. The aerial vehicle can target an automobile by obtaining a feature parameter such as a license number and/or an automobile body contour and/or an automobile color of the automobile, and further trace the automobile.

The second obtaining module 45 is configured to obtain a second image photographed by the second lens module, the second image including the target object, and a quantity of pixels of the target object included in the second image being greater than a quantity of pixels of the target object in the first image.

In this embodiment of the present application, after an optical axis of the second lens module faces the target object, the second lens module photographs the second image, the second image including the target object.

In an optional implementation, a focal length of the first lens module and a focal length of the second lens module are both fixed focal lengths. Preferably, the focal length of the first lens module is less than the focal length of the second lens module. The first lens module may include a normal lens module and/or a wide-angle lens module and the second lens module may include a long-focus lens module. The first image photographed by the first lens module belongs to a large-perspective scene and the second image photographed by the second lens module belongs to a small-perspective scene.

When the first lens module includes the normal lens module and the wide-angle lens module, the normal lens module, the wide-angle lens module and the long-focus lens module may be arranged in a triangle or may be linearly arranged. Optionally, the normal lens module may have an equivalent focal length of 35 mm, the wide-angle lens module may have an equivalent focal length of 18 mm to 24 mm, and an equivalent focal length of the long-focus lens module may be 3 to 20 times the equivalent focal length of the wide-angle lens module.

The image generation module 47 is configured to determine an output image based on the first image and the second image.

In an optional implementation, combination manners for the first image and the second image may be image compositing. Specifically, as shown in FIG. 4, an area 211 in the first image 210 that includes the target object is replaced with the second image 220, and as shown in FIG. 5, the first image 210 including the second image 220 is determined as the output image.

In an optional implementation, combination manners for the first image and the second image may alternatively be image overlaying. Specifically, as shown in FIG. 6, the second image 230 is overlaid on the first image 240, and the first image 240 and the second image 230 that are overlaid are determined as the output image. The second image 230 may be overlaid at positions such as a top right corner, a top left corner, a bottom right corner, or a bottom left corner of the first image 240, and the second image 230 may be zoomed in or zoomed out according to a user operation. For example, the second image 230 is zoomed in through a double-touch operation, to cover the first image 240.

The first obtaining module 41 and the second obtaining module 45 may be flight-control chips or vision chips in the aerial vehicle. The image generation module 47 may be an independent image processing chip or an image processing unit integrated in a flight-control chip or a vision chip.

This embodiment of the present application provides an image processing apparatus. The first obtaining module obtains a first image photographed by the first lens module, the first image including a target object; then the second obtaining module obtains a second image photographed by the second lens module; and the image generation module generates an output image based on the first image and the second image, so that a range in a large-perspective scene and precision of a target object in a small-perspective scene can be both combined.

Figure 10:
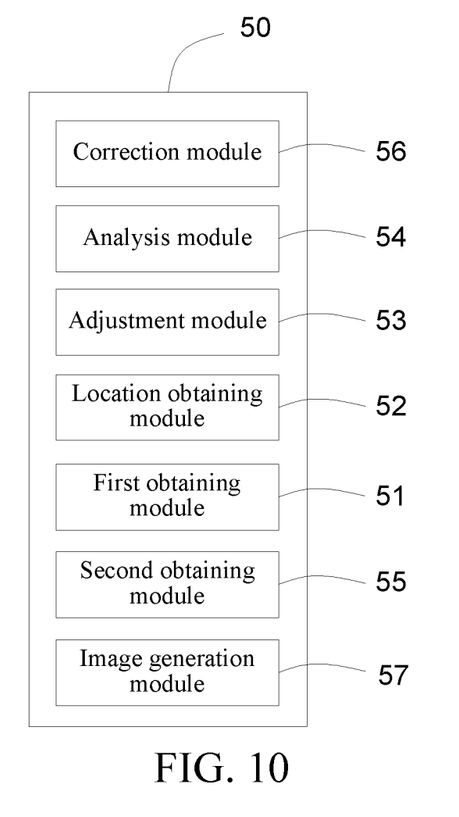
FIG. 10 is a functional block diagram of an image processing apparatus according to another embodiment of the present application.

As shown in FIG. 10, an embodiment of the present application provides an image processing apparatus 50, which may be configured to perform a method for processing an image disclosed in the embodiments of the present application. The image is photographed by a multi-camera photographing apparatus, the multi-camera photographing apparatus including a first lens module and a second lens module. The multi-camera photographing apparatus may be mounted in the image processing apparatus 50, or may be mounted in another device and transmit, to the image processing apparatus 50, an image photographed by the device. The apparatus 50 may include a first obtaining module 51, a location obtaining module 52, an adjustment module 53, a second obtaining module 55, a correction module 56, an image generation module 57 and an analysis module 54.

The first obtaining module 51 is configured to obtain a first image photographed by the first lens module, the first image including a target object.

The location obtaining module 52 is configured to obtain location information of the target object.

The adjustment module 53 is configured to adjust an optical axis of the second lens module based on the location information of the target object, so that the optical axis of the second lens module faces the target object.

The second obtaining module 55 is configured to obtain a second image photographed by the second lens module, the second image including the target object, and a quantity of pixels of the target object included in the second image being greater than a quantity of pixels of the target object in the first image.

In this embodiment of the present application, for explanations and descriptions of the first obtaining module 51 and the second obtaining module 55, refer to the foregoing explanations and descriptions of the first obtaining module 41 and the second obtaining module 45, and details are not described herein again.

The correction module 56 is configured to correct optical axes of the first lens module and the second lens module or to correct the first image and the second image based on an optical-axis offset of the multi-camera photographing apparatus.

In this embodiment of the present application, the first image and the second image may be corrected based on the optical-axis offset of the multi-camera photographing apparatus. For example, distortion of the first image and the second image is corrected.

The analysis module 54 is configured to perform registration analysis on the first lens module and the second lens module and to generate a corresponding registration parameter.

The image generation module 57 is configured to replace an area in the first image that includes the target object with the second image based on the registration parameter, and to generate an output image of the first image including the second image.

In this embodiment of the present application, for explanations and descriptions of the image generation module 57, refer to the foregoing explanations and descriptions of a case in which combination manners for the first image and the second image in the image generation module 47 are image overlaying.

In other embodiments of the present application, the image generation module 57 may further be configured to overlay the second image on the first image and to determine the first image and the second image that are overlaid as the output image.

This embodiment of the present application provides an image processing apparatus. The first obtaining module obtains a first image photographed by the first lens module, the first image including a target object. The location obtaining module obtains location information of the target object. The adjustment module adjusts an optical axis of the second lens module based on the location information of the target object, so that the optical axis of the second lens module faces the target object. The second obtaining module obtains a second image photographed by the second lens module. The correction module corrects the first image and the second image based on an optical-axis offset of the multi-camera photographing apparatus. The image generation module replaces an area in the corrected first image that includes the second image with the corrected second image, and determines the first image including the corrected second image as an output image. A range in a large-perspective scene and precision of a target object in a small-perspective scene can be both combined, to obtain an output image having a relatively desirable combination effect.

The first obtaining module 51, the location obtaining module 52, the correction module 56, the analysis module 54 and the second obtaining module 55 may be flight-control chips or vision chips in an aerial vehicle. The adjustment module 53 may be a flight-control chip or a control chip controlling rotation of a gimbal. The image generation module 57 may be an independent image processing chip or an image processing unit integrated in a flight-control chip or a vision chip.

Figure 11:
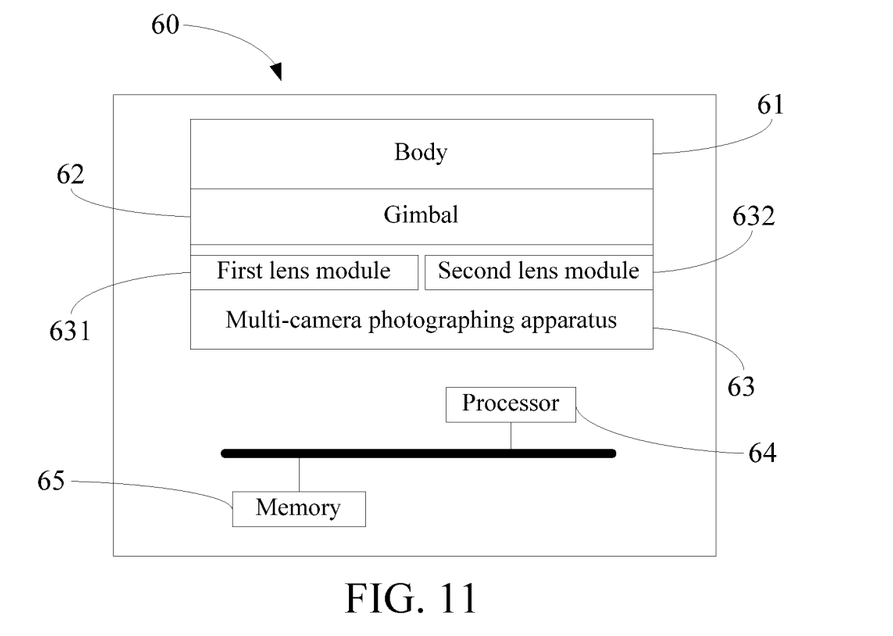
FIG. 11 is a schematic structural diagram of hardware of an aerial vehicle for performing a method for processing an image according to an embodiment of the present application.

FIG. 11 is a schematic structural diagram of hardware of an aerial vehicle 60 for performing a method for processing an image according to an embodiment of the present application. The aerial vehicle 60 may include: a body 61, a gimbal 62 disposed on the body 61 and a multi-camera photographing apparatus 63 disposed on the gimbal 62. The multi-camera photographing apparatus 63 includes a first lens module 631 and a second lens module 632. The aerial vehicle 60 may further include at least one processor 64 and a memory 65 in communication connection with the at least one processor 64. The memory 65 stores an instruction capable of being executed by the at least one processor 64, and the instruction is executed by the at least one processor 64, to enable the at least one processor 64 to perform the foregoing method for processing an image. A processor 64 is used as an example in FIG. 6. The processor 64 and the memory 65 may be connected by using a bus or in other manners. An example in which the processor 64 and the memory 65 are connected by using a bus is used in FIG. 6.

The memory 65 is used as a non-volatile computer-readable storage medium, and can be configured to store a non-volatile software program, a non-volatile computer-executable program and a module, for example, a program instruction/module (for example, the first obtaining module 41, the adjustment module 43, the second obtaining module 45 and the image determining module 47 that are shown in FIG. 4; and the first obtaining module 51, the adjustment module 53, the second obtaining module 55, the correction module 56 and the image determining module 57 that are shown in FIG. 5) correspondingly configured to perform the method for processing an image in the embodiments of the present application. The processor 64 runs the non-volatile software program, the instruction and the module that are stored in the memory 65, to perform various functional applications and data processing of the aerial vehicle 60, that is, to implement the method for processing an image in the foregoing method embodiment.

The memory 65 may include a program storage area and a data storage area. The program storage area may store an operating system and an application program required by at least one function. The data storage area may store data created according to use of the aerial vehicle 60 and the like. In addition, the memory 65 may include a high speed random access memory, and may further include a non-volatile memory, such as at least one magnetic disk storage device, a flash memory or other non-volatile solid-state storage devices. In some embodiments, the memory 65 may optionally include a memory remotely arranged relative to the processor 64, and the remote memory may be connected to the aerial vehicle 60 through a network. Instances of the network include, but are not limited to, the Internet, an intranet, a local area network, a mobile communications network and a combination thereof.

The one or more modules are stored in the memory 65, and when executed by the one or more processors 64, perform the method for processing an image in any of the foregoing method embodiments, for example, perform step S11, step S13, step S15 and step S17 in the method in FIG. 8, and implement functions of the first obtaining module 41, the adjustment module 43, the second obtaining module 45, and the image determining module 47 that are shown in FIG. 9 and functions of the first obtaining module 51, the adjustment module 53, the second obtaining module 55, the correction module 56 and the image determining module 57 that are in FIG. 10.

At last, it should be noted that the foregoing embodiments are merely intended to describe the technical solutions of the present application rather than limit the technical solutions of the present application. In the concept of the present application, technical features between the foregoing embodiments or different embodiments may be combined, steps may be performed in any sequence, and many other changes of the foregoing descriptions in different aspects of the present application exist. For brevity, the changes are not provided in details. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for processing an image, wherein the image is photographed by a multi-camera photographing apparatus, the multi-camera photographing apparatus comprising a first lens module and a second lens module, and the method comprises:
    obtaining a first image photographed by the first lens module, the first image comprising a target object;
    obtaining a second image photographed by the second lens module, the second image comprising the target object, and a quantity of pixels of the target object comprised in the second image being greater than a quantity of pixels of the target object in the first image; and
    performing image processing on the first image and the second image, and generating an output image;
    wherein the first lens module comprises a normal lens module and a wide-angle lens module, wherein the second lens module comprises a long-focus lens module, a normal lens module, a wide-angle lens module and the long-focus lens module are arranged in a triangle.

2. The method according to claim 1, wherein the method further comprises:
    obtaining location information of the target object; and
    adjusting an optical axis of the second lens module based on the location information of the target object, so that the optical axis of the second lens module faces the target object.

3. The method according to claim 1, wherein the performing image processing on the first image and the second image, and generating the output image comprises:
    replacing an area in the first image that comprises the target object with the second image, and determining the first image obtained after the replacement as the output image.

4. The method according to claim 1, wherein the performing image processing on the first image and the second image, and generating the output image comprises:
    overlaying the second image on the first image, and determining the first image and the second image that are overlaid as the output image.

5. The method according to claim 1, wherein the method further comprises:
    performing optical axis correction on optical axes of the first lens module and the second lens module.

6. The method according to claim 1, wherein the method further comprises:
    performing registration analysis on the first lens module and the second lens module, and generating a corresponding registration parameter.

7. The method according to claim 6, wherein the performing image processing on the first image and the second image, and generating the output image comprises:
    performing image processing on the first image and the second image based on the registration parameter, and generating the output image.

8. The method according to claim 1, wherein the triangle is an isosceles triangle.

9. The method according to claim 8, wherein the first lens module comprises the normal lens module and the wide-angle lens module, the normal lens module having an equivalent focal length of 35 mm, the wide-angle lens module having an equivalent focal length of 18 mm to 24 mm, and an equivalent focal length of the long-focus lens module being 3 to 20 times the equivalent focal length of the wide-angle lens module.

10. An aerial vehicle, comprising a vehicle body, arms connected to the vehicle body, power apparatuses disposed on the arms, a multi-camera photographing apparatus connected to the vehicle body and an image processing chip, the multi-camera photographing apparatus comprising a first lens module and a second lens module, and the image processing chip being configured to:
  obtain a first image photographed by the first lens module, the first image comprising a target object;
  obtain a second image photographed by the second lens module, the second image comprising the target object, and a quantity of pixels of the target object comprised in the second image being greater than a quantity of pixels of the target object in the first image; and
  perform image processing on the first image and the second image, and generate an output image;
  wherein the first lens module comprises a normal lens module and a wide-angle lens module, wherein the second lens module comprises a long-focus lens module, a normal lens module, a wide-angle lens module and the long-focus lens module are arranged in a triangle.

11. The aerial vehicle according to claim 10, wherein the image processing chip is specifically configured to:
  replace an area in the first image that comprises the target object with the second image, and determine the first image obtained after the replacement as the output image.

12. The aerial vehicle according to claim 10, wherein the image processing chip is specifically configured to:
  overlay the second image on the first image, and determine the first image and the second image that are overlaid as the output image.

13. The aerial vehicle according to claim 10, wherein the aerial vehicle further comprises a controller and a gimbal that are connected to the vehicle body, the controller being configured to control the gimbal to perform optical axis correction on optical axes of the first lens module and the second lens module.

14. The aerial vehicle according to claim 12, wherein the controller is further configured to obtain location information of the target object and to adjust an optical axis of the second lens module based on the location information of the target object, so that the optical axis of the second lens module faces the target object.

15. The aerial vehicle according to claim 13, wherein the controller is further configured to perform registration analysis on the first lens module and the second lens module and to generate a corresponding registration parameter.

16. The aerial vehicle according to claim 10, wherein the aerial vehicle further comprises a controller, configured to perform registration analysis on the first lens module and the second lens module and to generate a corresponding registration parameter.

17. The aerial vehicle according to claim 15, wherein the image processing chip is further configured to perform image processing on the first image and the second image based on the registration parameter and to generate the output image.

18. The aerial vehicle according to claim 10, wherein the multi-camera photographing apparatus comprises a body, and the first lens module and the second lens module that are disposed on the body, the first lens module and the second lens module being arranged in an array on the body.

19. The aerial vehicle according to claim 18, wherein the first lens module comprises a normal lens module and/or a wide-angle lens module and the second lens module comprises a long-focus lens module.

* * * * *